April 28, 1953             G. PIERSON              2,636,422
PULP MOLDING APPARATUS HAVING A FORMING DEVICE AND
A SPRING-ACTUATED FLEXIBLE PERMEABLE STRUCTURE
Filed Aug. 6, 1947             4 Sheets-Sheet 1
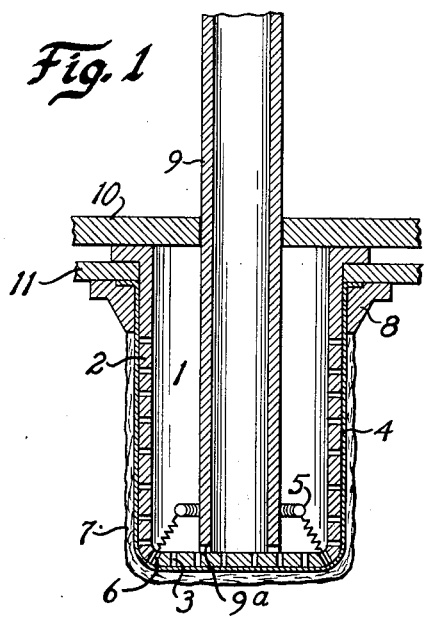
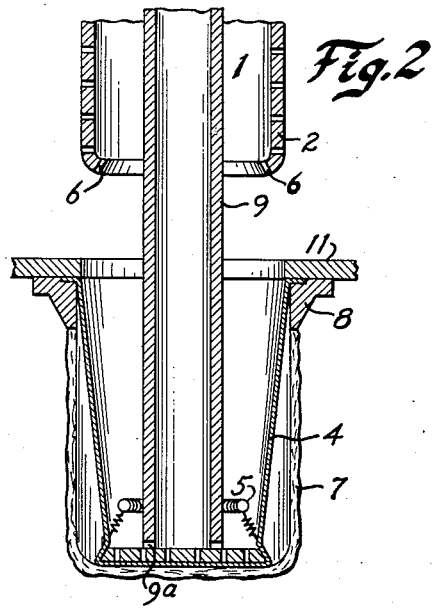
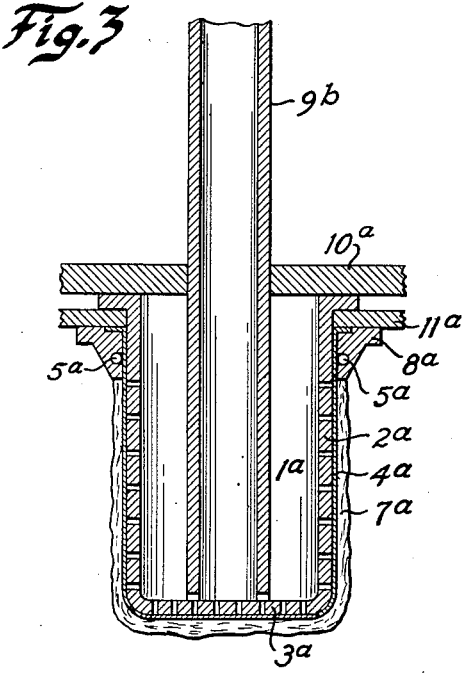
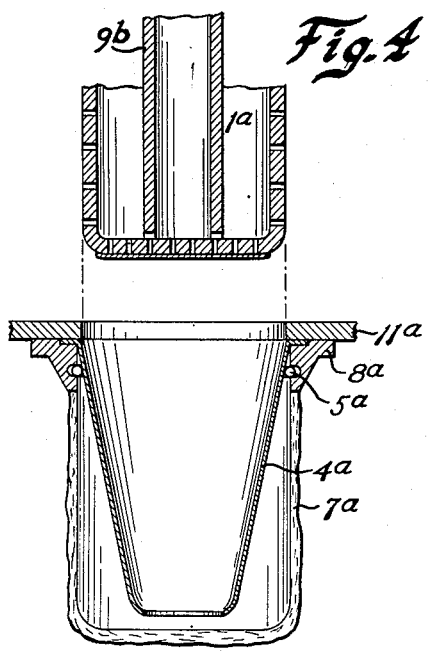
Inventor
Georges Pierson
By
Attorney

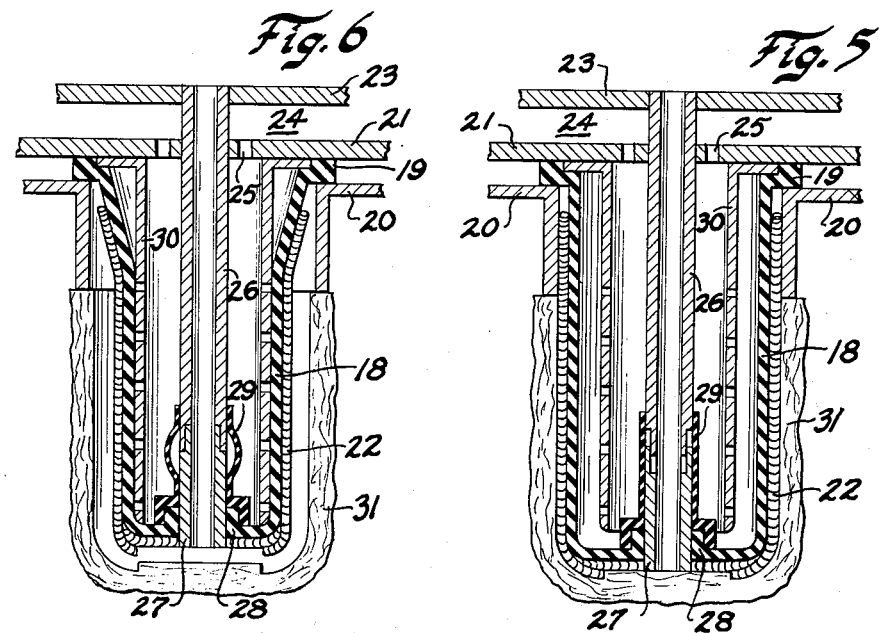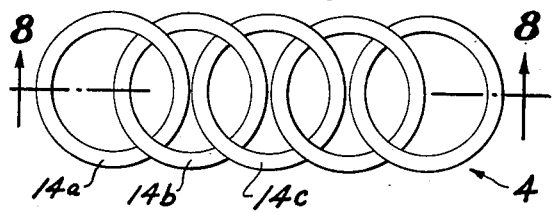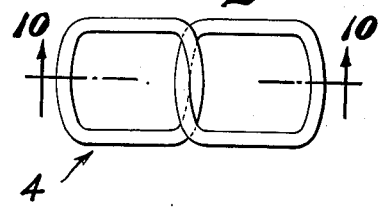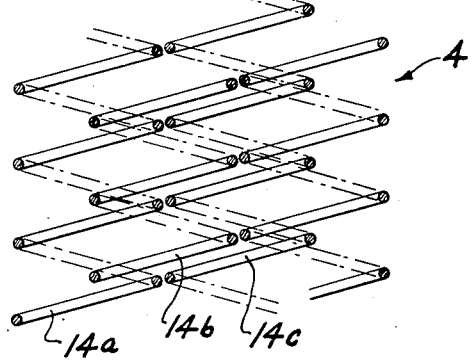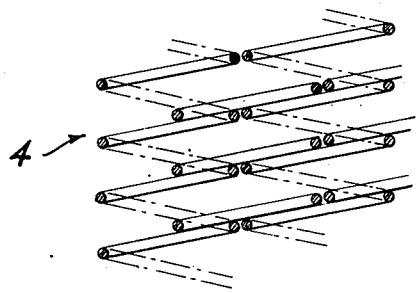

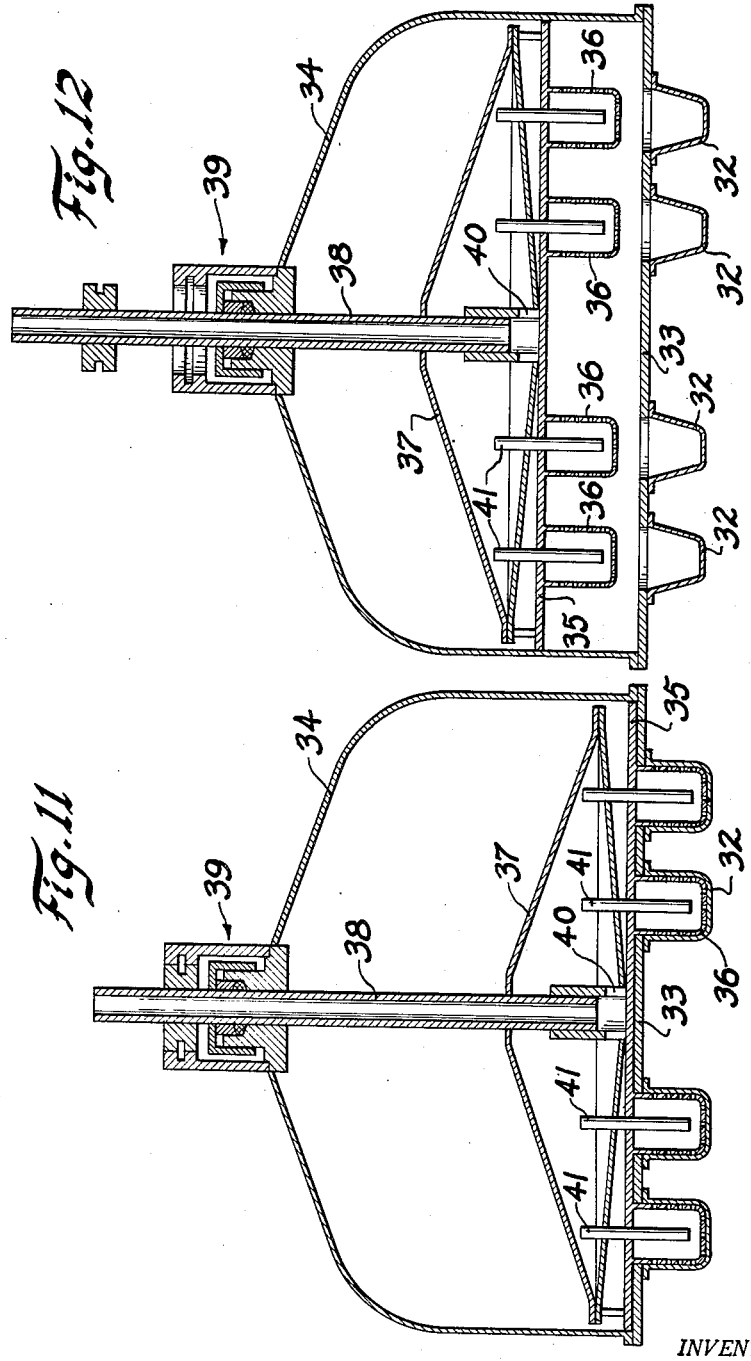

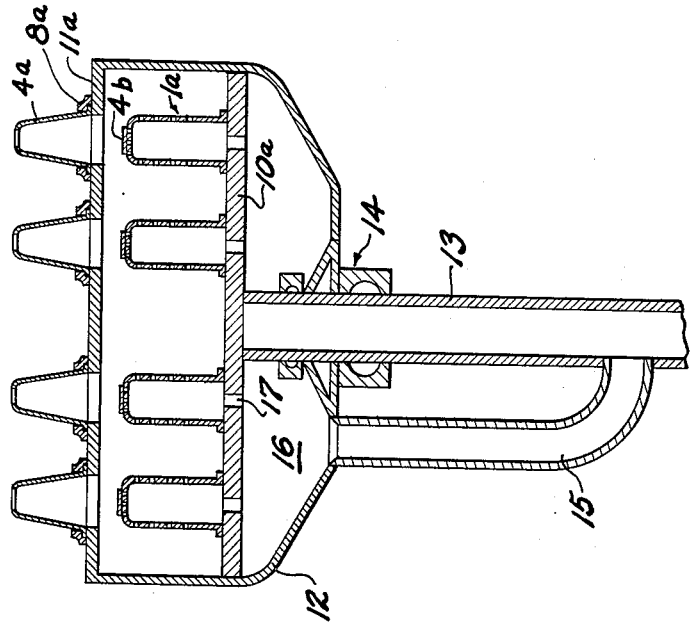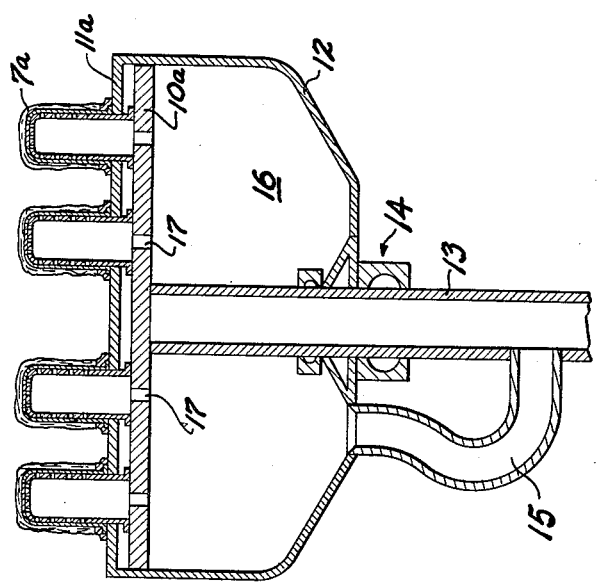

Patented Apr. 28, 1953

2,636,422

UNITED STATES PATENT OFFICE 2,636,422

PULP MOLDING APPARATUS HAVING A FORMING DEVICE AND A SPRING-ACTUATED FLEXIBLE PERMEABLE STRUCTURE

Georges Pierson, Neuilly-sur-Seine, France

Application August 6, 1947, Serial No. 766,550
In France January 14, 1944

Section 1, Public Law 690, August 8, 1946
Patent expires January 14, 1964

3 Claims. (Cl. 92—57)

The present invention relates to apparatus for forming shaped articles by pulp molding.

In the manufacture of articles formed of cellulose fibre (or any other matter which can be suspended in a liquid) and which are formed on or in a mold through the walls of which the liquid can filter, it is difficult to strip the damp rough from the mold by sure means which do not need any handling and it is furthermore very difficult to form deep shapes with a compact and strong material.

The object of the present invention, is to overcome these difficulties and enable mass manufacture through multiple and automatic operations and to provide an arrangement which can be used either as a mold for the formation of a roughly molded article thereon, as a transporting mold, or as a drying mold for giving the final shape to the articles.

The arrangement embodying the present invention and achieving the above objects includes a male forming device insertable into a permeable membrane or structure which is secured, so as not to suffer any movements which might damage the rough at the time of the deformation of the membrane by withdrawal of the male forming device. This membrane is however, transversely deformable by spring means which cause its contraction, and act to automatically detach this membrane from the rough or from the article, during or after the withdrawal of the male forming device.

The aforesaid arrangement may in particular be utilised together with a mold carrier on which it is mounted for immersion in a body of fluent pulp, and which includes suction means for withdrawing liquid internally of the forming arrangement so that pulp will be deposited externally of the membrane, and means for effecting the movement of the male forming device relative to the membrane. Such a mold carrier may consist of a table or casing which supports the male forming device, and is manually placed inside a second casing bearing the membranes for dipping the latter into a fluent pulp and enveloping the table or internal casing in an air tight manner.

In order to facilitate understanding of the present invention, illustrative embodiments thereof are hereinafter described in detail and shown in the accompanying drawings, wherein:

Fig. 1 is a vertical sectional view through a forming device embodying the present invention and with the parts thereof positioned for the formation of a molded article thereon;

Fig. 2 is a view similar to Fig. 1, but with the parts positioned for stripping of the molded article therefrom;

Fig. 3 is a view similar to Fig. 1, but of another embodiment of the invention;

Fig. 4 is a view similar to Fig. 2, but of the embodiment of the invention shown in Fig. 3;

Fig. 5 is a view similar to Fig. 1, but of still another embodiment of the invention;

Fig. 6 is a view similar to Fig. 2, but of the embodiment of the invention shown in Fig. 5;

Fig. 7 is an edge view of a flexible membrane material, on a greatly enlarged scale, which is employed in the devices of Figs. 1, 3 and 5;

Fig. 8 is a sectional view taken along the line 8—8 of Fig. 7;

Fig. 9 is a fragmentary edge view of another flexible membrane material which may be employed in the embodiments of the invention shown in Figs. 1, 3 and 5, and which is shown on a greatly enlarged scale;

Fig. 10 is a sectional view along the line 10—10 of Fig. 9;

Fig. 11 is a vertical sectional view showing a carrier construction for supporting several molds, and illustrated with the parts disposed for the formation of articles on the associated molds;

Fig. 12 is a view similar to Fig. 11, but showing the parts disposed for stripping the formed articles from the molds;

Fig. 13 is a view similar to Fig. 11, but showing a carrier for molds of the kind illustrated in Figs. 3 and 4 with the molds arranged in inverted positions; and Fig. 14 is a view similar to Fig. 13, but showing the parts disposed for stripping of the formed articles from the mold.

Figure 1 shows an arrangement constructed in accordance with the present invention which includes a male forming device formed by a perforated side wall 2 defining openings at the top and bottom thereof and a perforated bottom wall 3 which is shaped to fit into the bottom opening of the side wall 2, and an upwardly opening flexible membrane 4 which depends from a support 8 and is formed to envelope the male forming device 4. The displacement of this membrane 4 in a direction parallel to its surface, that is, vertically, is prevented by the stationary bottom 3 of the male forming device 1, itself. Lateral contraction of the membrane is obtained by an elastic means 5, for example, a spring, which is disposed inside the male forming device and is attached to the membrane through the gap 6 which exists between the parts 2, 3 of the male forming device 1.

The lateral contraction of the membrane occurs during or as soon as the sidewall part 2 of the male forming device 1 corresponding to the sides of the rough or of the article is removed upwardly from its position within the membrane, as in Fig. 2.

Figs. 7 and 8 show the structure of a material that may be employed in forming the flexible membrane 4 of the mold embodying the present invention, and this flexible material includes a series of interlocked coils or spires 14a, 14b, 14c etc., screwed together to form a structure which is porous in all directions. The coils or spires 14a, 14b, 14c etc., are formed of an elastic or springy metal to permit flexing of the membrane 4 formed therefrom. However, a mesh or membrane formed from circular coils or spires, as in Figs. 7 and 8, has a relatively coarse surface and large thickness. In order to avoid these disadvantages, the coils or spires of the porous membrane material are preferably formed of a metal, for example, beryllium bronze, which can be softened and then hardened to resume its resilient character. Thus, after the adjacent circular coils or spires are screwed together, as in Figs. 7 and 8, the metal of the coils or spires is softened and pressure is applied against the opposite faces of the porous mesh material thereby laterally flattening the coils or spires, as in Figs. 9 and 10, to decrease the thickness and surface roughness of the mesh material. After the spires have been flattened, the assembly is again treated to restore the resiliency or hardness thereof.

The support 8 for the membrane 4 is mounted on a wall 11 with the membrane depending from the latter for immersion, when the wall 11 is lowered by suitable mechanism (not shown), in a body of fluent pulp (not shown). The side wall part 2 of the male forming device is carried by a table 10 which is movable relative to the wall 11 to extend the part 2 through an opening in the wall 11 into the membrane (Fig. 1) or to retract the part 2 from the membrane (Fig. 2).

A pipe 9, which is fixed relative to the wall 11, extends into the membrane 4 and, at its lower end, carries the bottom 3 of the male forming device and has suitable radial openings 9a for communicating the space inside the male forming device 1 with the pipe 9. Since the pipe 9 is fixed relative to the wall 11, it is apparent that the bottom 3 of the male forming device will resist movement of the membrane 4 in the direction parallel to the axis of the pipe 9 when the side wall part 2 is retracted from the membrane (Fig. 2). Finally, the pipe 9 is connected to a conventional suction device (not shown) so that a low pressure may be developed within the male forming device for drawing the liquid of the fluent pulp through the membrane 4 for exhaust through the pipe 9.

In operating the mold device of Figs. 1 and 2, the table 10 is moved toward the wall 11 to insert the side wall part 2 within the membrane 4 with the bottom 3 extending across the lower end of part 2. The wall 11 and table 10 are then lowered together to immerse the membrane 4 in a bath of fluent pulp (not shown), and suction is applied to the pipe 9 to draw the liquid of the bath through the pipe 9 and thereby cause the deposit of the fibre in the fluent pulp upon the external surface of the membrane 4 in the form of an article 7. When the table 10 and wall 11 are raised to remove the membrane 4 from the bath and the article has dried sufficiently, the table 10 is raised relative to the wall 11 to withdraw the part 2 from within the membrane 4, as in Fig. 2, so that the spring 5 is then effective to laterally contract the membrane 4 away from the article 7 to permit the latter to be easily stripped from the mold. During stripping of the article 7 from the mold, the pipe 9 is preferably communicated with the atmosphere, so that the normal suction in the pipe 9 will not resist the removal of the article.

Figs. 3 and 4 illustrate another embodiment of the invention wherein the parts of the molding device are identified by the same numerals employed in connection with the corresponding parts of the first described embodiment, but with the letter "a" annexed thereto. The molding device of Figs. 3 and 4 includes a one-piece male forming member 1A having integral, perforated side and bottom walls 2a and 3a, respectively, and the member 1a depends from a vertically movable table 10a which is vertically movable relative to a wall 11a. A suction pipe 9a extends axially into the male forming member 1a and is movable with the latter.

A porous membrane depends from the wall 11a and includes a bottom part 4b, carried by the bottom 3a of the male forming member, and a separate side part 4a which extends downwardly from a sealing or shielding element 8a securing the side part 4a, at its upper end, to the wall 11a. At least the side part 4a of the porous membrane is formed of a porous structure resisting movement in the vertical direction, that is, in the direction generally parallel to the movement of the male forming member 1a, and which is yieldable laterally, that is, in the direction substantially at right angles to the movement of member 1a. For example, the part 4a of the porous membrane can be formed of a mesh structure of the kind illustrated in Figs. 9 and 10 and described hereinabove. A circular tension spring 5a extends around the side part 4a of the membrane at a location spaced downwardly from the top edge of the latter but above the upper edge of the article 7a formed on the membrane, that upper edge of the article being defined by the lower edge of the shielding member 8a. The spring 5a acts on the part 4a of the membrane to continuously urge the latter to a laterally contracted condition (Fig. 4). When the table 10a is moved toward the support wall 11a, as in Fig. 3, the male forming member 1a extends into the membrane part 4a and laterally expands the latter with the lower edge of the side part 4a meeting the peripheral edge of the bottom part 4b of the membrane carried by the bottom 3a of the male forming member. The table 10a and wall 11a are then simultaneously displaced to immerse the membrane parts 4a and 4b in a bath of fluent pulp (not shown) and vacuum is applied to the pipe 9a to cause the deposit of a coating of fibres on the porous membrane in the manner previously described. After the coating of fibres has attained a sufficient thickness, the table 10a and wall 11a are simultaneously displaced to remove the mold device from the bath so that the coating may dry. After the coating forming an article 7a has dried, the vacuum within the male forming member 1a is broken, and the table 10a is displaced to withdraw the male forming member 1a from the part 4a of the membrane thereby separating the bottom part 4b of the membrane from the side part 4a and permitting the spring 5a to laterally contract the side part 4a of the membrane away from the article 7a (Fig. 4) so that the latter may be easily stripped.

In Figs. 13 and 14, a carrier arrangement is shown for supporting a plurality of mold devices of the kind illustrated in detail in Figs. 3 and 4, with such mold devices being inverted to produce articles which open downwardly. In the carrier arrangement of Figs. 13 and 14, the wall 11a supporting the side parts 4a of the porous membranes forms the end wall of a casing 12, and the table 10a fits tightly within the casing 12 and is vertically reciprocatable. A hollow actuating stem 13 is fixed to the table 10a and extends slidably out of the casing through a suitable sealing gland structure 14. A flexible conduit 15 extends from the casing 12 to the hollow stem 13 to communicate the chamber 16 below the table 10a with the stem 13. The stem 13 is vertically reciprocated by suitable means (not shown) to displace the table 10a between the positions shown in Figs. 13 and 14. The stem 13 is further adapted to be connected alternately to a source of low pressure and to atmospheric pressure so that the pressure in the chamber 16 is varied accordingly. Since the mold devices are inverted, liquid drawn into the male forming members 1a will lie on the upper surface of wall 10a, and the pipe 9b, shown in Figs. 3 and 4, of each mold device is eliminated when the latter is inverted. Thus, in Figs. 13 and 14, the interior of each male forming member 1a is communicated with the chamber 16 through a related opening 17 formed in the table 10a.

Referring now to Figs. 5 and 6, an arrangement is there shown which is particularly suitable for use as a drying mold or former for giving the final shape to the article. This drying mold includes a flexible and elastic male forming device 18, which may be formed of rubber and the like, and normally has the shape indicated in Fig. 6. The elastic male forming device 18 is generally cup-shaped and is formed with a radial flange 19 around the top edge thereof which is secured between a shield member 20 and a wall 21. The upper portion of the side wall of the male forming device 18 normally tapers downwardly, as shown in Fig. 6, and a membrane 22 formed, for example, of the mesh structure shown in Figs. 9 and 10, is porous in all directions and extends tightly around the male forming device 18 when the latter is in its normal or contracted condition (Fig. 6). The spring coils making up the mesh structure of the membrane 22 permit the expansion and contraction of the latter with the rubber male forming device 18. A wall 23 is spaced above the wall 21 to define a passage 24 between the walls 21 and 23, and openings 25 are formed in the wall 21 to communicate the interior of the male forming device 18 with the passage 24. A support column 26 extends fixedly from the wall 23 through the wall 21 and centrally into the male forming device 18. The column 26 is provided with an axially extensible portion 27 at its lower end which is received in an apertured boss 28 formed in the bottom of the rubber device 18. A flexible sealing gland 29 extends around the joint between the column 26 and the extensible portion 27 and covers the boss 28 for effectively sealing the interior of the male forming device 18 except for the communication with the passage 24 through the openings 25. A perforated former 30 depends from the wall 21 into the male forming device 18 and supports the side wall of the latter when the male forming device is in its contracted or normal condition (Fig. 6).

The passage 24 is adapted to be connected to a source of compressed air (not shown) after an article 31 has been placed over the membrane 22. The compressed air enters the interior of the elastic male forming device 18 through the openings 25 and expands the male forming device, both laterally and downwardly, so that the membrane 22 also expands and contacts the sides and bottom of the internal surface of the article 31 to give the final shape to the latter, as in Fig. 5. When the passage 24 is again placed in communication with the atmosphere to reduce the pressure in the interior of the male forming device, the latter and the surrounding membrane 22 elastically return to their normal configurations (Fig. 6) so that the membrane is spaced from the article at the sides and bottom and the article may be easily stripped from the mold.

Referring now to Figs. 11 and 12, another carrier arrangement for mold devices is there illustrated. In the arrangement of Figs. 11 and 12, each mold device includes a cup-shaped membrane 32 which is porous in all directions and is both elastic and flexible, for example, being formed of a mesh structure of the kind shown in Figs. 9 and 10. The membranes 32 depend from the lower wall 33 of a casing 34 and normally have the downwardly tapering configuration shown in Fig. 12. A table 35 is vertically reciprocatable within the casing 34 and carries depending rigid and perforated male forming devices 36 for entry into the related membranes 32 when the table 35 is lowered towards the wall 33. The male forming devices 36 are shaped to laterally and longitudinally distend or enlarge the normally tapering membranes 32 when the male forming devices are positioned within the membranes, as in Fig. 11.

An inner casing 37 is movable vertically within the casing 34, and a hollow pipe 38 extends from the casing 37 and slidably out of the casing 34 through a gland construction 39. The pipe 38 is adapted to be alternatively connected, at its upper end, to a source of vacuum (not shown) or to the atmosphere, and, at its lower end, the pipe 38 opens into the interior of the casing 37, as at 40. Further, suitable mechanism (not shown) may be provided for effecting the vertical reciprocation of the pipe 38 and hence the casing 37, table 35 and male forming devices 36. Finally, a pipe 41 extends through the table 35 for each male forming device 36 and at its opposite ends opens into the interiors of the related male forming device and the casing 37, respectively.

In operating the arrangement of Figs. 11 and 12, the casing 37 is first lowered in the casing 34 to cause the male forming devices 36 to enter the related membranes 32. Then the casing 34 is lowered to immerse the distended membranes in a bath of fluent pulp and the pipe 38 is connected to a vacuum source so that liquid is drawn from the bath through the membranes 32 and into the interiors of the devices 36 to cause the deposit of fibres on the surfaces of the membranes and thereby forming articles on the latter. Then, the casing 34 is raised to remove the membranes from the bath and permit drying of the articles, and, finally, the casing 37 is raised within the casing 34 to withdraw the devices 36 from the membranes so that the latter elastically contract to permit the easy stripping of the dry articles from the membranes.

While illustrative embodiments of the invention have been described in detail and shown in the accompanying drawings, it is to be understood that the invention is not limited to these precise embodiments, and that various changes and modifications may be effected therein without departing from the scope or spirit of the invention as defined in the appended claims.

What is claimed is:

1. Apparatus for forming shaped articles by pulp molding; comprising a permeable male forming-device for immersion in a body of fluent pulp, a permeable structure having a laterally contractible side wall portion open at least at one end and receiving said forming-device to envelop the outer surface of the latter, suction means for withdrawal of liquid internally of said forming device so that pulp will be deposited externally of said permeable structure to form a shaped article thereon, and spring actuated means acting continuously against said side wall portion for yieldably contracting the latter in the lateral direction so that said side wall portion is automatically disengaged from the article formed thereon when said male forming-device is withdrawn from said permeable structure through said open end of the latter.

2. Apparatus for forming shaped articles by pulp molding; comprising a support having at least one opening therethrough, a permeable flexible structure carried by said support for immersion in a body of fluent pulp and opening at one end in registration with said support opening, a permeable male forming-device including an end-wall portion fixedly positioned within said permeable structure and a side-wall portion separate from said end wall portion, said side-wall portion being movable through said open end of the permeable structure from a position within the latter to a position outside of the permeable structure, suction means for withdrawing liquid from the fluent pulp through said permeable structure and said forming-device so that pulp will be deposited externally of said permeable structure to form a shaped article thereon, and elastic means continuously acting on said permeable structure and contracting the latter in the lateral direction when said side-wall portion of the forming-device is moved to said position outside of the permeable structure thereby automatically disengaging the permeable structure from the article formed thereon.

3. Apparatus for forming shaped articles by pulp molding; comprising a permeable male forming device for immersion in a body of fluent pulp, a permeable structure including an end portion on an end of said male forming device and a side wall portion open at its opposite ends and receiving said male forming device through one of said opposite ends so that said end portion of the permeable structure extends across the other end of said side wall portion and said permeable structure envelops the outer surface of said male forming device, suction means for withdrawal of liquid internally of said male forming device so that pulp will be deposited externally of said permeable structure to form a shaped article thereon, said side wall portion of the permeable structure being contractable laterally, and a spring member extending around said side wall portion of the permeable structure and acting continuously against said side wall portion at a location spaced from said one end of the latter for yieldably urging said side wall portion to contract laterally so that said side wall portion of the permeable structure is automatically disengaged from the article formed thereon when said male forming device is withdrawn from said permeable structure through said one end of the side wall portion thereof.

GEORGES PIERSON.

References Cited in the file of this patent

UNITED STATES PATENTS

| Number | Name | Date |
|---|---|---|
| 190,654 | Wheeler | May 8, 1877 |
| 368,794 | Tobey | Aug. 23, 1887 |
| 504,730 | Lane | Sept. 12, 1893 |
| 708,642 | Howard | Sept. 9, 1902 |
| 1,041,129 | Mauersberger | Oct. 15, 1912 |
| 1,637,532 | Oliver et al. | Aug. 2, 1927 |
| 1,899,197 | Huff et al. | Feb. 28, 1933 |
| 2,089,746 | Gray | Aug. 10, 1937 |
| 2,187,918 | Sloan | Jan. 23, 1940 |
| 2,213,902 | Daniels | Sept. 3, 1940 |